Patented Nov. 28, 1950

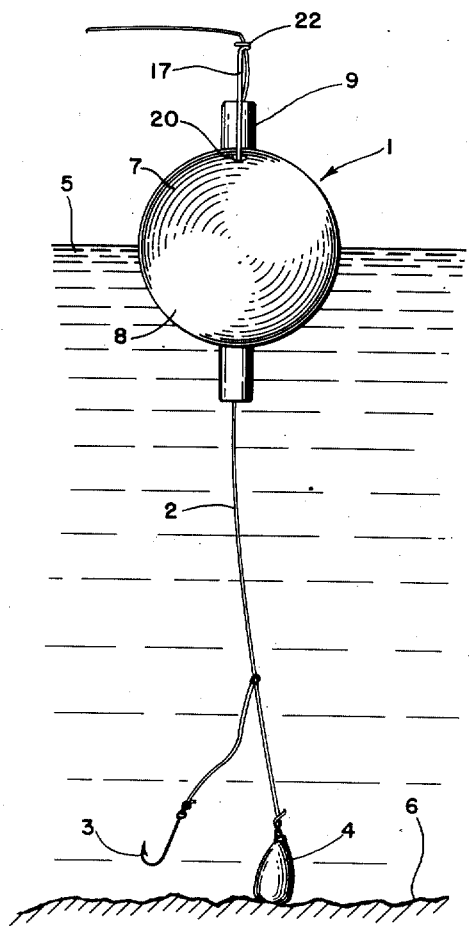
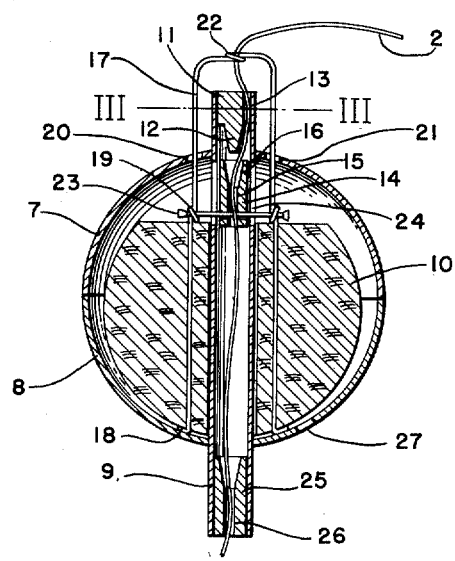
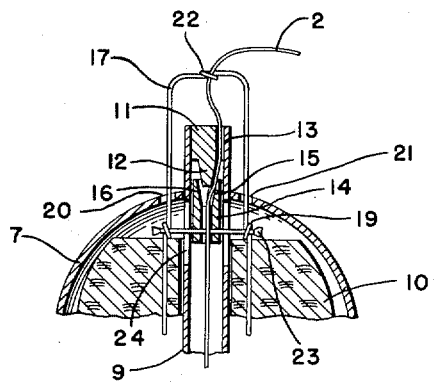
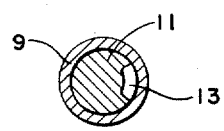

2,531,806

UNITED STATES PATENT OFFICE 2,531,806

FISH TACKLE FLOAT

Earl A. Coughlin, Detroit, Mich.

Application March 11, 1948, Serial No. 14,309

3 Claims. (Cl. 43—44.91)

This invention relates to fish tackle floats or bobs and, in particular, it relates to a float capable of automatically adjusting the hook and length of the line which extends from the float.

In the art of fishing, a float or bob is frequently used to support the fishing line so that it extends a proper distance in the water. This float functions in two ways: it acts as a visible signal to indicate when a fish is on the line, and it also permits the line to be dropped a substantial distance away from the point where the fisherman operates. The most conventional type of float consists of a solid cork body with a wood shaft extending therethrough. One of the principal difficulties with the conventional type of float is that it is difficult to gauge the depth of the water. This is essential because it is desirable that the length of line extending from the float should be such that the line should be substantially equal in length to the depth of the water, and that the line should be tied to the float for accommodating such depth. With the conventional float it is difficult to tie the line to the float so that the length of the line will equal the depth of the water. This is particularly difficult when the float is thrown a substantial distance from the point where the fisherman is located. In such cases it is usually necessary to repeat the operation of throwing the float out several times, and each time varying the fish hook end of the line in an effort to determine the depth of the water.

In accordance with the practice of my invention, I provide automatic means for attaching the line to the float when the fish hook end of the line strikes the bottom of the water. This is accomplished by a differential operating float which permits the line to pass thereby until a sinker at the end of the line strikes the water bottom. At such time, the differential operating float causes the line to be pinched, thus securing the line with the float.

Another advantage of my invention is that it permits the use of rod and reel so as to cast the float. In such case, the float slips up to the fish hook lead and serves as an additional weight for casting. In this way the fisherman may cast a considerable distance from a boat, or other point of vantage. As soon as the float hits the water the sinker carries the line toward the bottom, and as the sinker hits the bottom the line becomes secured with the float, thus automatically gauging the depth of the water.

These and other objects and advantages will appear more fully in the following detailed description when considered in connection with the accompanying drawing, in which:

Figure 1 is a side elevational view of the float of my invention illustrating the relative position of the float line with the surface of the water and the water bottom;

Figure 2 is a side view, in section, of the float;

Figure 3 is a transverse view, in section, of the tube taken along lines III—III of Figure 2; looking upward and, Figure 4 is a side view, in section, of a portion of the float illustrating the relative movement of the float mechanism.

With reference to the drawing and, in particular, to Figure 1, I show an assembly of my invention in the form of a float, having associated therewith a line 2, fish hook 3, and sinker 4. The float rests upon the surface of the water 5, and the sinker rests upon the water bottom 6.

As shown in Figure 2, the float 1 consists essentially of a ball formed of two halves 7 and 8 joined together after assembly by means of a cementing operation, or by other means of attaching the two halves together. The ball 7—8 is provided with a thin wall and may be formed of metal or, preferably, plastic. Extending axially through the ball 7—8 is a tubular member 9 which also may be formed of metal or plastic material. This tube 9 is attached to the ball 7—8 by being press-fitted therewith, or by being cemented thereto. The tube passes through the ball 7—8, and a portion of each end of the tube projects from the ball. Within the ball 7—8 is a float 10, preferably formed of cork, being capable of moving axially of the tube 9.

At the top of the tube 9 and rigidly attached therewith is a plug 11 having a cone-shaped projection 12 extending therefrom in the direction of the length of the tube. A slot 13 (Figure 3) is formed in the plug to permit passage of the line 2. Positioned a short distance from the plug 11 is a sleeve 14 also located within the tube 9. The sleeve 14 fits loosely within the tube 9 so that it may be easily moved axially of the tube. The sleeve 14 includes an aperture 15 extending through the lower portion thereof. This aperture 15 communicates with a tapered aperture 16 at the upper portion of the sleeve 14. The tapered aperture 16 is of such taper that it coincides with the cone-shaped projection 12 extending from the plug 11. The purpose of these tapered portions is to provide a clamping action against the line 2 which passes through the slot 13 and through the apertures 16 and 15. I have found that the proper angle of the tapers 12 and 16 should be approximately two degrees. As hereinafter described, the sleeve 14 is capable of moving relative to the cone-shaped projection 12 so as to effect the clamping of the line 2.

Attached to the cork float 10 is a wire guide 17. This guide is substantially U-shaped, inverted, and its ends pass through the cork float 10 and are bent over at 18 so as to secure the wire in place. At the opposite side of the float 10 the wire 17 is bent around to form an eye 19. This serves as a stop and also provides a support, as hereinafter described. The wire 17 extends through apertures 20 and 21 formed in the upper half of the ball 7. At the top of the wire 17 the wire is again bent around to form an eye 22 through which the line 2 passes. The wire 17, therefore, serves as a guide for the line 2, and also serves as means which may be depressed for the purpose of disengaging the line when it becomes tightly clamped between the tapered surfaces 12 and 16.

The sleeve 14 is actuated axially within the tube 9 by means of a rod or wire 23 which extends transversely through the tube 9, and is supported in the eyes 19 formed in the wire 17. The outer ends of the wire 23 may be squeezed or bent so as to be retained in relative position with the wire 17. Slots 24 are formed longitudinally in the tube 9 and at diametrically opposed sides so as to permit longitudinal movement of the wire 23 relative to the tube 9. This arrangement permits the clamping action between the tapered surfaces 12 and 16. At the bottom of the tube 9 is a weight 25. This weight is provided with an aperture 26 which is chamfered to permit easier guiding of the line therethrough. The principal purpose of the weight 25 is to serve as a ballast so that the lower end of the tube 9 will always assume a lowermost position when the float is in the water. Extending through the wall of the lower half of the ball 8 and at a point near the tube 9 is an aperture 27. This aperture is approximately one-eighth inch in diameter, and its purpose is to permit water to enter slowly into the interior of the ball 7—8 and allow the water to react with the float 10.

In the operation of the float of my invention, the float 1 may be moved along the line 2 until the float reaches a stop where the fish hook 3 is attached to the line 2. In this position the float and line may be thrown or cast to the desired fishing location. As the float hits the water the fisherman feeds sufficient line so as to form a continuous slack. Since there is no restriction within the float mechanism, the line 4 begins to descend in the water. Within a very short period the sinker 4 strikes the bottom and there is sufficient resistance through the float mechanism to prevent the line from following through in excess. The moment the float hits the water, the water begins to enter the aperture 27 in the lower portion of the ball 8. Shortly after the sinker 4 hits the bottom there is a sufficient amount of water within the ball 7—8 so that the ball and tube 9 begin to sink while the cork float 10 maintains the entire assembly afloat. This relative difference between the sinking portion and the floating portion causes the sleeve 14 to move upward with the cork float 10 and pinch or squeeze the line 2 between the tapered surfaces 12 and 16. I have found that this tapered clamping arrangement functions effectively for gripping the line 2 and for maintaining the line in such effective position as if it were tied to the float. This device, therefore, not only functions to automtically gauge the depth of the water, but it eliminates any necessity of tying or otherwise kinking the line, and therefore preserves the usefulness of the line. Additionally, the automatic function of the device of my invention reduces the time required for preparation of fishing and, therefore, allows greater time to be spent in the actual fishing operation.

It is believed that I have provided a novel arrangement for assisting fishermen, and one, which tests have demonstrated, operates efficiently, and which can be manufactured economically. While I have described a preferred embodiment of my invention it is to be understood that it is susceptible of those modifications which appear obviously within the spirit of my invention and as appearing in the scope of the appended claims.

Having thus described my invention, what I claim and desire to protect by Letters Patent is:

1. A fishing bob of the character described comprising, a buoyant float, a ball float movable relative to the buoyant float and comprising walls forming a hollow chamber having an aperture extending therethru in the region of its lowermost portion for serving as a water inlet, a tubular member extending axially through said floats, and attached to said secondary float, said buoyant float being axially slidable on said tubular member, a clamping element positioned within said tubular member and in fixed relation with said ball float, a complementary clamping element within said tubular member and in fixed relation with said buoyant float, and a fish line extending through said tubular member and between said clamping elements, whereby when relative movement between the floats is effected to move one clamp against the other the fish line will be held between the clamping elements for securing the fish line with the bob.

2. A fishing bob of the character described comprising, a buoyant float, a ball float movable relative to the buoyant float and comprising walls forming a hollow chamber having an aperture extending therethru in the region of its lowermost portion for serving as a water inlet, a tubular member extending axially through said floats, and attached to said secondary float, said buoyant float being axially slidable on said tubular member, a clamping element positioned within said tubular member and in fixed relation with said ball float, a complementary clamping element within said tubular member and in fixed relation with said buoyant float, a fish line extending through said tubular member and between said clamping elements, and a weight at the lowermost end of the tubular member, whereby when relative movement between the floats is effected to move one clamp against the other the first line will be held between the clamping elements for securing the fish line with the bob.

3. A fishing bob of the character described comprising, a buoyant float, a ball float movable relative to the buoyant float and comprising walls forming a hollow chamber having an aperture extending therethru in the region of its lowermost portion for serving as a water inlet, said buoyant float being positioned entirely within said ball float and being of such size as to permit substantial movement within said secondary float, a clamping element in fixed relation with said buoyant float, a complementary clamping element in fixed relation with said ball float, and a fish line extending through said floats and between said clamping elements whereby when relative movement between the floats is effected to move one clamp against the other the fish line will be held between the clamping elements for securing the fish line with the bob.

EARL A. COUGHLIN.

REFERENCES CITED

The following references are of record in the file of this patent:

UNITED STATES PATENTS

| Number | Name | Date |
|---|---|---|
| 2,052,262 | Walberg | Aug. 25, 1935 |